United States Patent [19]

Takokoro et al.

[11] Patent Number: 5,025,430
[45] Date of Patent: Jun. 18, 1991

[54] MAGNETO-OPTIC RECORDING AND REPRODUCING APPARATUS INCLUDING A MULTIPLE LAYER RECORDING MEDIUM HAVING A PREMAGNETIZED BIAS LAYER REPLACING AN EXTERNAL BIAS MAGNETIC

[75] Inventors: Michihiro Takokoro; Kazuo Okada; Hitoshi Imai, all of Amagasaki, Japan

[73] Assignee: Mitsubishi Denki Kabushiki Kaisha, Tokyo, Japan

[21] Appl. No.: 176,152

[22] Filed: Mar. 31, 1988

[30] Foreign Application Priority Data

Apr. 3, 1987 [JP] Japan ................... 62-83392

[51] Int. Cl.$^5$ ............................................. G11B 13/04
[52] U.S. Cl. ...................... 369/13; 360/114; 360/59
[58] Field of Search ............ 369/13; 360/59, 114, 360/131, 135; 365/122; 428/694

[56] References Cited

U.S. PATENT DOCUMENTS

| 4,293,621 | 10/1981 | Togami | 428/678 |
| 4,645,722 | 2/1987 | Katayama et al. | 365/122 |
| 4,649,519 | 3/1987 | Sun et al. | 365/122 |
| 4,670,356 | 6/1987 | Sato et al. | 428/693 |
| 4,771,347 | 9/1988 | Horimai et al. | 369/13 |
| 4,794,560 | 12/1988 | Bell et al. | 360/59 |
| 4,878,132 | 10/1989 | Aratani et al. | 369/13 X |
| 4,908,809 | 3/1990 | Tadokoro et al. | 365/122 X |

FOREIGN PATENT DOCUMENTS

| 0180459 | 5/1986 | European Pat. Off. |
| 61-22455 | 1/1986 | Japan. |
| 60-177455 | 1/1986 | Japan. |
| 2095887 | 10/1982 | United Kingdom. |

OTHER PUBLICATIONS

Patent Abstracts of Japan, vol. 6, No. 162 (p-137) (1040), Aug. 25, 1982, of JP-A-57 78653.
IBM Technical Disclosure Bulletin, vol. 10, No. 2, Jul. 1967, New York, U.S., pp. 144-145; J. S. Judge et al.; Magnetic Memory Device Utilizing Coupled Film.
"Single Beam Over Write Method Using Multilayered Magneto Optical Media", 28p-ZL-3, Extended Abstracts (The 34th Spring Meeting, 1987); The Japan Society of Applied Physics and Related Societies; Published on Mar. 28, 1987.

*Primary Examiner*—Stuart S. Levy
*Assistant Examiner*—Hoa Nguyen
*Attorney, Agent, or Firm*—Fleit, Jacobson, Cohn, Price, Holman & Stern

[57] ABSTRACT

A magneto-optic recording a reproducing apparatus including a magneto-optic information-carrying medium having three magnetic layers. A magnetic bias field is generatedd by a third layer which is premagnetized in the direction parallel to the thickness thereof. A second layer is magnetized by a magnetizing unit. The laser beam incident on the layers is controlled to three intensities for writing and reading information.

10 Claims, 4 Drawing Sheets

NEW DATA | OLD DATA

NEW DATA | OLD DATA

MAGNETO-OPTIC RECORDING AND REPRODUCING APPARATUS INCLUDING A MULTIPLE LAYER RECORDING MEDIUM HAVING A PREMAGNETIZED BIAS LAYER REPLACING AN EXTERNAL BIAS MAGNETIC

BACKGROUND OF THE INVENTION

This invention relates to a magneto-optic recording and reproducing apparatus wherein new information can be overwritten directly on old information.

FIGS. 3A and 3B illustrate the principle of the prior art of magneto-optic information recording and reproducing as shown in "Single Beam Over Write Method Using Multilayered Magneto Optical Media," 28p-ZL-3, Extended Abstracts (The 34th Spring Meeting, 1987); The Japan Society of Applied Physics and Related Societies. FIG. 3A shows an oblique view; FIG. 3B is a cross-sectional view showing the main parts. The apparatus in these drawings comprises a magneto-optic information-carrying medium 1, which in turn comprises a glass or plastic substrate 2 and two ferromagnetic layers: a first layer 3 and a second layer 4. The apparatus also comprises an objective lens 5 for focusing a laser beam onto the information-carrying medium 1, where it forms a focused spot 6. Reference numeral 7 designates a region on the first layer 3 where binary data "1" is recorded by magnetization in the upward direction in FIG. 3B. The apparatus also comprises two magnets: an initializing magnet 8 for creating an initial magnetic alignment in the second layer 4; and a bias magnet 9 located opposite the objective lens 5 on the other side of the information-carrying medium 1.

This apparatus operates as follows. A support and drive mechanism not shown in the drawings turns the information-carrying medium 1 in a fixed direction (indicated by arrow a in the drawing). The first layer 3, which is positioned on the incident side of the laser beam, has properties similar to those of the recording layer of the information-carrying media used in ordinary magneto-optic discs, and also operates as a recording layer in the apparatus under discussion. The second layer 4, called the supplementary layer, is provided to enable overwriting; that is, to enable new data to be written over old data directly. Let Tc1 and Tc2 be the Curie temperatures of the first layer 3 and second layer 4, and let Hc1 and Hc2 be the coercive forces of first layer 3 and second layer 4, respectively. These parameters of the two layers satisfy the following relationships:

$Tc1 < Tc2$ $Hc1 > Hc2$

Let us first consider the reading of information recorded on the recording layer, that is, the first layer 3. The objective lens 5 is driven by a driving mechanism not shown in the drawings in the direction of its optic axis and in a direction perpendicular to its optic axis (the radial direction of the information-carrying medium) so as to keep the spot 6 in focus and on the track on the recording layer.

As shown in FIG. 3B, the recording layer is magnetized parallel to its thickness direction. The magnetic alignment is either up or down in the drawing, these two directions corresoponding to "0" and "1" of binary codes. Magnetization in the up direction in the drawing represents "1." When the information is read, the spot 6 is focused onto the first layer 3. The magnetic alignment of the first layer 3 is converted to optical information through a well-known magneto-optic effect (such as the Kerr effect); thus the information on the information-carrying medium 1 is detected. The intensity of the laser beam on the information-carrying medium 1 in this reading operation is controlled by a controller 21 to an intensity equivalent to a in FIG. 4. At this intensity the temperatures of regions of the first layer 3 and second layer 4 illuminated by the focused spot 6 do not reach their Curie temperatures Tc1 and Tc2, so the focused spot 6 does not erase the recorded information, that is, the magnetic alignment.

Information is overwritten as follows. The information-carrying medium 1 is subject to an external magnetic field Hini (indicated by arrow b in the drawing) generated by initializing magnet 8 in FIG. 3B. The external magnetic field is related to the coercive forces of the first layer 3 and second layer 4 as follows:

$Hini < Hc1$ $Hini > Hc2$.

As the information-carrying medium 1 rotates in direction a in FIG. 3B, when the second layer 4 passes over the initializing magnet 8 it is uniformly magnetized in the up direction, regardless of the magnetic alignment of the first layer 3. At room temperature the first layer 3 retains its existing magnetic alignment, being unaffected by the magnetic field generated by the initializing magnet 8 or the magnetic field generated by the magnetization of the second layer 4.

To write the information "1," that is, to magnetize the first layer 3 in the up direction, the laser beam is modulated by the controller 21 to an intensity equivalent to b in FIG. 4. The temperature of the region of the first layer 3 where the spot 6 is focused by the objective lens 5 then rises until it exceeds the Curie temperature Tc1 of the first layer 3, destroying the magnetic alignment of the first layer 3. The second layer 4, however, remains below its Curie temperature Tc2, so it retains the upward magnetic alignment given it by the initializing magnet 8. When the region of the first layer 3 illuminated by the focused spot 6 cools, it therefore acquires the upward magnetic alignment in accordance with that of the second layer 4.

To write the information "0," that is, to magnetize the first layer 3 in the down direction, the laser beam is modulated by the controller 21 to an intensity equivalent to c in FIG. 4. In this case the temperatures in the regions illuminated by the focused spot 6 on the first layer 3 and the second layer 4 rise until they exceed the Curie temperatures Tc1 and Tc2, respectively, causing both layers to lose their magnetic alignment. Due to a weak external magnetic field Hb, with magnetic alignment indicated by arrow c in the drawing, generated by the bias magnet 9 located opposite the objective lens 5 on the other side of the information-carrying medium 1, however, the second layer 4 is remagnetized in the direction of the magnetic field Hb, namely the down direction. When the first layer 3 cools, it acquires the downward magnetic alignment of the second layer 4. In this way the first layer 3 is magnetized in the down direction. The intensity of the external bias field Hb is weak but within the range consistent with the above operation.

As described above, new information can be overwritten directly on old information by modulating the laser beam between intensities b and c in FIG. 4 in accordance with the binary codes "1" and "0".

Since the information-carrying medium according to the prior art is structured as described above, two external magnets, an initializing magnet and a bias magnet need to be provided. Especially in principle, the bias magnet has to be placed opposite the objective lens on the other side with respect to the information-carrying medium. Aa a result, the magneto-optic recording and reproducing apparatus becomes large in size and complex in structure.

Also because the distance between the bias magnet and the information-carrying medium varies due to undulation of the surface of the information-carrying medium, the effect of the magnetic bias filed Hb on the second layer is unstable.

SUMMARY OF THE INVENTION

An object of this invention is to solve the problems stated above.

Another object of this invention is to provide a magneto-optic recording and reproducing apparatus which is small in size and has a stable effect of the magnetic bias field.

According to the invention, there is provided a magneto-optic recording and reproducing apparatus comprising a magneto-optic information-carrying medium comprising
  a first layer,
  a second layer, and
  a third layer,
    wherein these layers are magnetic layers and are stacked on a substrate in the above order from the side on which the laser beam for recording or reproducing information is incident, and the third layer is premagnetized in a uniform direction parallel to the thickness thereof,
a magnetizing means generating a magnetic field for causing the magnetization of the second layer to be reversed at room temperature,
a controller controlling the laser beam to three intensities;
  a first intensity causing the magnetizations on the first to third layers not to be erased by rises in temperature due to incidence of the laser beam,
  a second intensity causing the magnetization only on the first layer to be erased by a rise in temperature due to incidence of the laser beam, and
  a third intensity causing the magnetizations on the first layer and the second layer to be erased by rises in temperature due to incidence of the laser beam.

Since a third magnetic layer generates a magnetic bias field and the information is recorded and reproduced by laser beam with three intensities, an external bias magnet as in the prior art is completely eliminated. The magnetooptic recording and reproducing apparatus can therefore be small in size and simple in structure, without the complexity of the configuration in which a bias magnet is mounted opposite the objective lens. In addition, the magnetic bias field has a uniform effect on the second layer regardless of the surface undulation of the information-carrying medium.

DETAILED DESCRIPTION OF THE PREFERRED EMBODIMENTS

Figure 1A:
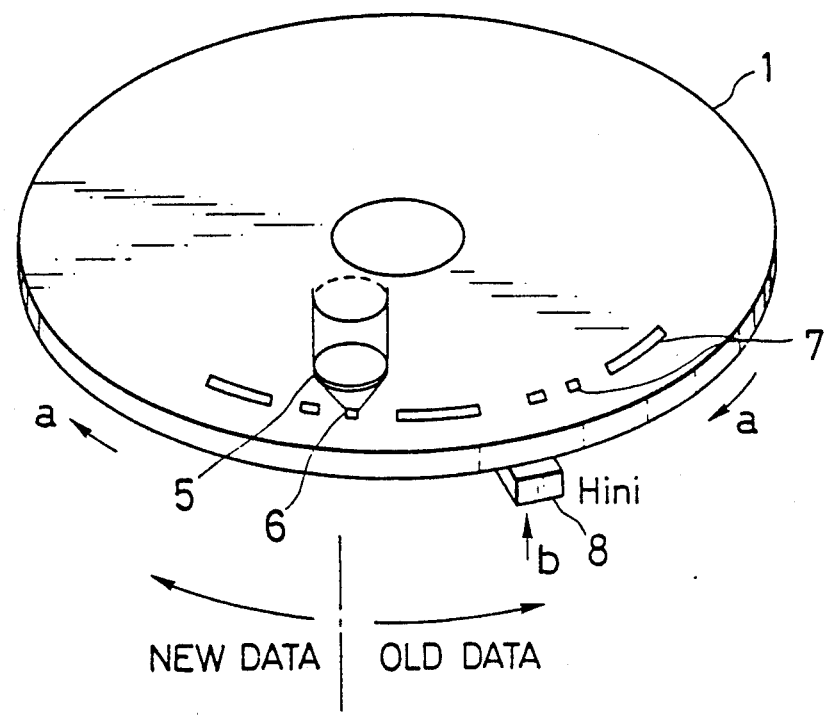
FIG. 1A is an oblique view of a first embodiment of the present invention showing how the invention is used.
Figure 1B:
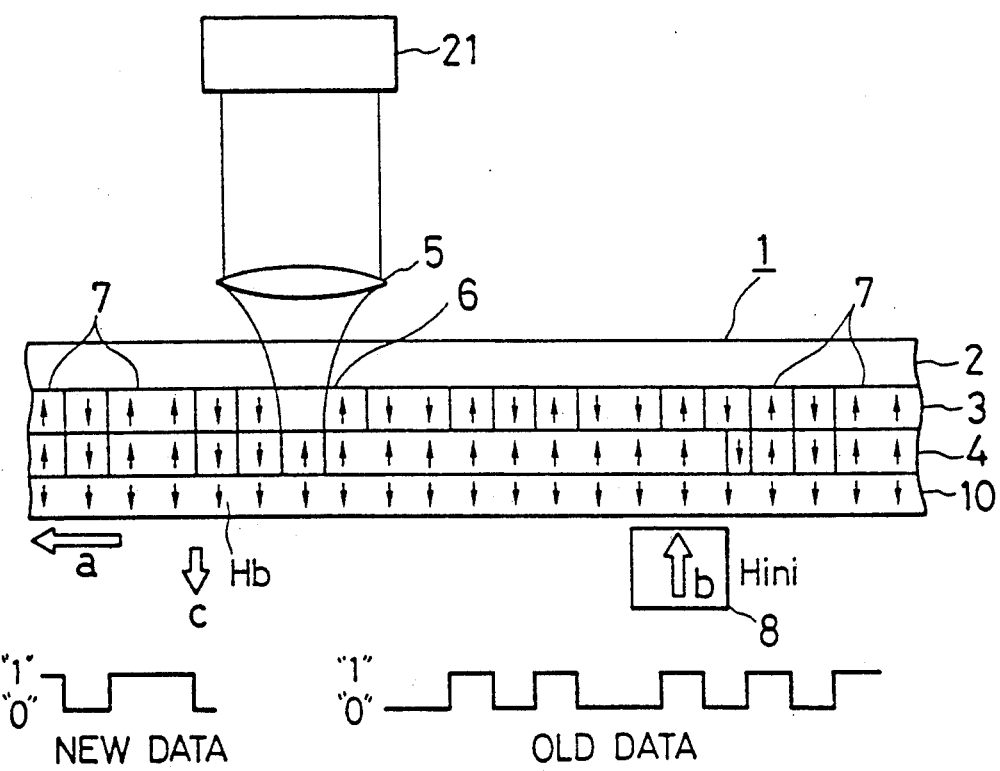
FIG. 1B is a cross-sectional view of the first embodiment of the present invention indicating how information is written.

An embodiment of this invention will now be described with reference to the drawings. Elements 1 through 8 in FIGS. 1A and 1B are the same as in the prior art. The additional element is a third layer 10 of ferromagnetic material. The information-carrying medium 1 basically comprises a substrate 2 and three ferromagnetic layers 3, 4 and 10. These layers have axes of easy magnetization in the direction parallel to the thickness thereof.

21 is a controller controlling the laser beam to three intensities; a first intensity causing the magnetizations on the first to third layers 3, 4 and 10 not to be erased by rises in temperature due to incidence of the laser beam, a second intensity causing the magnetization only on the first layer 3 to be erased by a rise in temperature due to incidence of the laser beam, and a third intensity causing the magnetizations on the first layer 3 and the second layer 4 to be erased by rises in temperature due to incidence of the laser beam.

This embodiment operates as follows. The information-carrying medium 1 is rotated in the direction of the arrow a in the drawing. The three ferromagnetic layers of the information-carrying medium 1 are stacked so that, from the side on which the laser beam is incident, the first layer 3 is on top, the second layer 4 is in the middle, and the third layer 10 is at the bottom. The first layer 3 possesses the same properties as the recording layer in the information-carrying media used in ordinary magneto-optic discs. Information is recorded in this layer. The second layer 4 and the third layer 10, which are called supplementary layers, are provided to enable overwriting. Let Tc1, Tc2 and Tc3 be the Curie temperatures of the first layer 3, the second layer 4 and the third layer 10, and let Hc1, Hc2 and Hc3 be the coercive forces of the first layer 3, the second layer 4 and the third layer 10 respectively. These parameters of the three layers satisfy the following relationships:

$$Tc1 < Tc2 < Tc3$$

$$Hc1 > Hc3 > Hc2,$$

or $$Hc1 > Hc2$$

and $$Hc3 > Hc2$$

The third layer 10 is uniformly premagnetized in the down direction (the direction of arrow c in FIG. 1B). The magnetic field Hb resulting from the magnetization of the third layer 10 is too weak to affect the magnetic alignment of the first layer 3 and second layer 4 at room temperature.

Information recorded in the recording layer (the first layer 3) is read as follows. The objective lens 5 is driven as in the prior art to keep the spot 6 in focus on the recording surface and keep it on an information track. Information is then read from the information-carrying medium 1 by detecting the direction of magnetic alignment (parallel to the thickness of the layer; up or down in the drawing) of the first layer 3 by means of a magneto-optic effect. The intensity of the laser beam at the time of reading is modulated by the controller 21 to an intensity equivalent to a in FIG. 4. At this intensity the regions of the first layer 3, the second layer 4 and the third layer 10 illuminated by the focused spot 6 do not reach their Curie temperatures Tc1, Tc2 and Tc3, so the focused spot 6 does not erase the recorded information by destroying the magnetic alignment.

Information is overwritten as follows. The initializing magnet 8 in FIG. 1B generates an external field Hini (indicated by arrow b in the drawing). The external field Hini is related to the coercive forces of the first layer 3, the second layer 4 and the third layer 10 as follows:

$$Hini < Hc1$$

$$Hini > Hc2$$

$$Hini < Hc3.$$

Accordingly, as the information-carrying medium 1 rotates in direction a in FIG. 1A, when the medium 1 passes over the initializing magnet 8 the second layer 4 is uniformly magnetized in the up direction in the drawing, regardless of the magnetic alignment of the first layer 3 and third layer 10. The magnetic field generated by the second layer 4 is weaker than the coercive force Hc1 of the first layer 3 and the coercive force Hc3 of the third layer 10, so at room temperature it does not affect the magnetic alignment of the first layer 3 and the third layer 10. However, at room temperature, the magnetic field of the second layer 4 is reversed by the initializing magnet 8.

Figure 4:
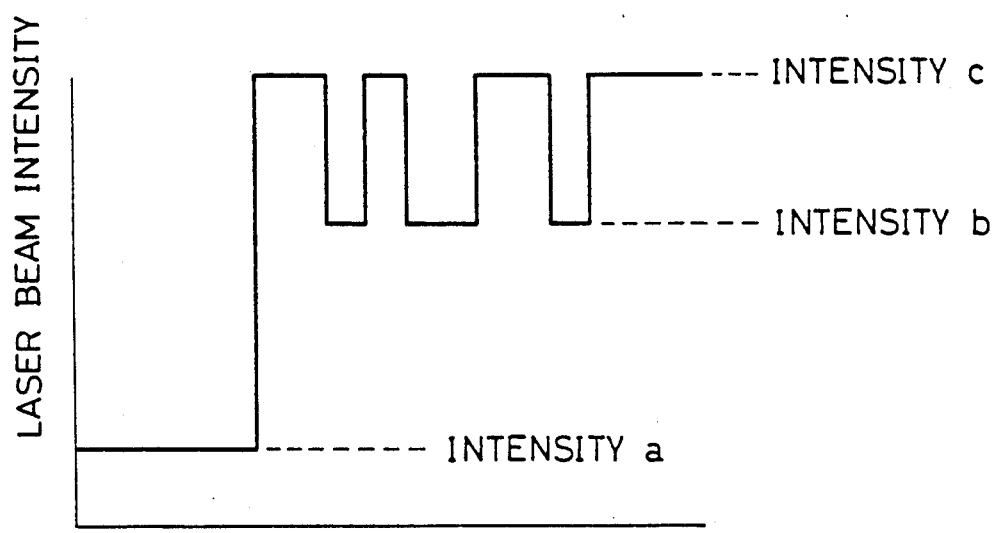
FIG. 4 indicates the intensity modulation of the laser beam.

To write the information "1," that is, to magnetize the first layer 3 in the up direction, the laser beam is modulated by the controller 21 to an intensity equivalent to b in FIG. 4. The temperature of the region of the first layer 3 where the spot 6 is focused by the objective lens 5 then rises until it exceeds the Curie temperature Tc1 of the first layer 3, destroying the magnetic alignment of the first layer 3. The temperatures of second layer 4 and third layer 10, however, remain below their Curie temperatures Tc2 and Tc3, so the second layer 4 retains the upward magnetic alignment by the initializing magnet 8 and the third layer 10 retains its original down alignment.

The first layer 3 is subject to the magnetic fields generated by both the second layer 4 and the third layer 10, but as stated previously, the magnetic field Hb of the third layer 10, which is aligned in the downward direction of the arrow c, is weak; the magnetic field of the second layer 4, which is aligned in the upward direction of the arrow b, has a stronger effect on the first layer 3. Therefore, the region of the first layer 3, which was illuminated by the focused spot 6 and the temperature of which raised above its Curie temperature Tc1, acquires the magnetic alignment of the second layer 4 at the time of cooling. The result is that the first layer 3 is magnetized in the up direction.

To write the information "0," that is, to magnetize the first layer 3 in the down direction, the laser beam is modulated by the controller 21 to an intensity equivalent to c in FIG. 4. Due to the higher beam intensity, in this case the temperatures in the regions illuminated by the focused spot 6 on the first layer 3 and the second layer 4 rise until they exceed the Curie temperatures Tc1 and Tc2, causing both the first layer 3 and the second layer 4 to lose their magnetic alignments in the regions illuminated by the focused spot 6. The temperature in the region illuminated by the focused spot 6 on the third layer 10, however, does not reach the Curie temperature Tc3 of that layer, causing the third layer 10 to retain the magnetic field Hb. The second layer 4 is therefore remagnetized in reverse in the down direction by the magnetic field Hb. When the first layer 3 cools, it acquires the downward magnetic alignment of the second layer 4. As a result the first layer 3 is magnetized in the down direction.

To summarize the above explanation:

[1] When the Curie temperature Tc1 is exceeded, the magnetic alignment of the second layer 4 is transferred to the first layer 3.

[2] At room temperature, the second layer 4 is uniformly magnetized in the up direction by the magnetic field Hini of the initializing magnet 8, regardless of the magnetic alignment of the first layer 3 and the third layer 10.

[3] When the Curie temperature Tc2 is exceeded, the magnetic field Hb of the third layer 10 magnetizes the second layer 4 in the down direction.

Information can thus be overwritten in the manner explained above by modulating the intensity of the laser beam between intensities b and c in FIG. 4.

The provision of a third layer 10 in the information-carrying medium 1 of this invention and its uniform premagnetization in the down direction as described above not only ensures that the effect of the magnetic bias field Hb on the second layer 4 is constant; but also eliminates the need for an external bias magnet 9. The magneto-optic recording and reproducing apparatus can therefore be small in size and simple in structure, without the complexity of the configuration in which a bias magnet 9 is mounted in a position opposite the objective lens 5.

Figure 2A:
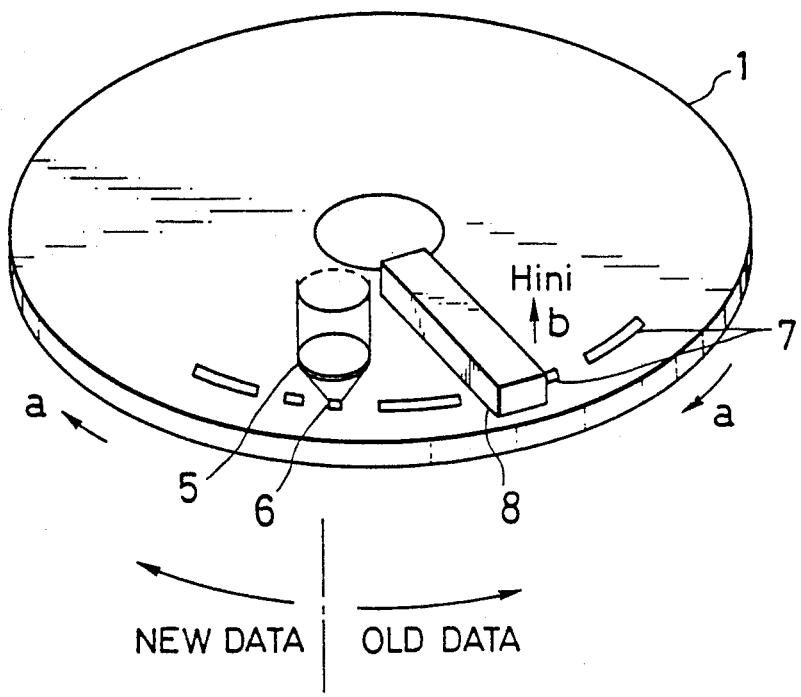
FIG. 2A is an oblique view of a second embodiment of the present invention showing how the invention is used.
Figure 2B:
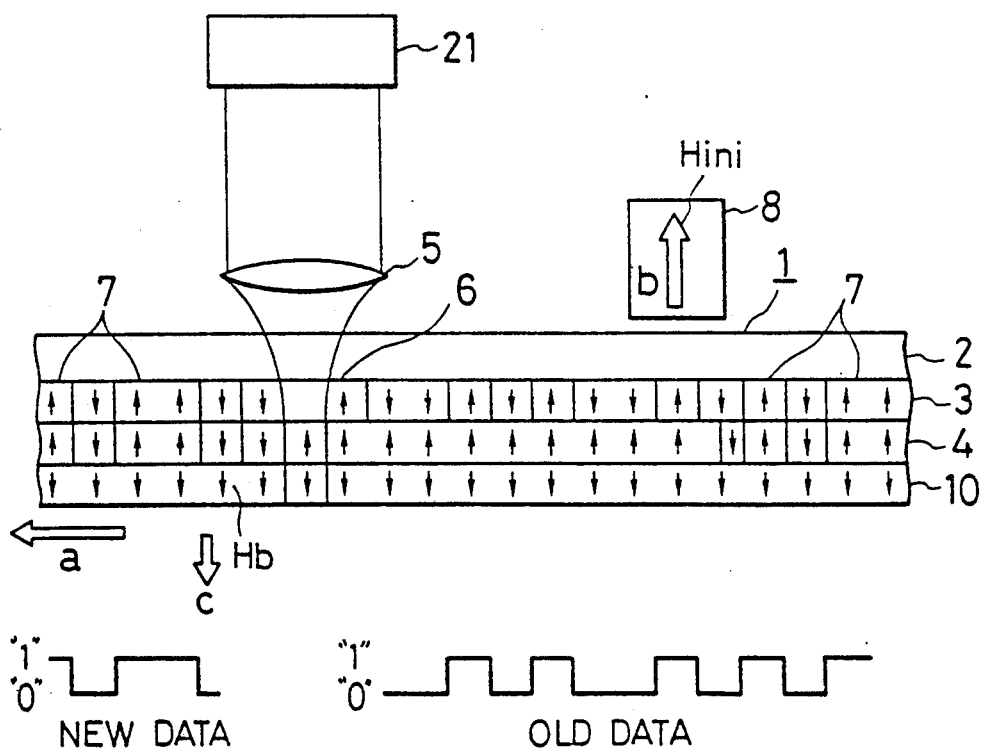
FIG. 2B is a cross-sectional view of the second embodiment of the present invention indicating how information is written.
Figure 3A:
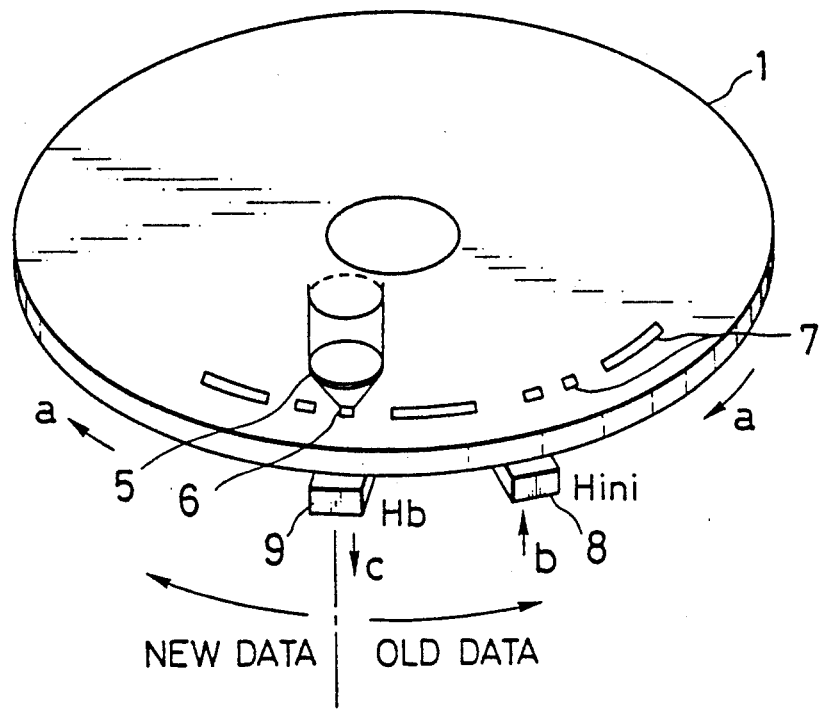
FIG. 3A is an oblique view of the prior art showing how the prior art is used.
Figure 3B:
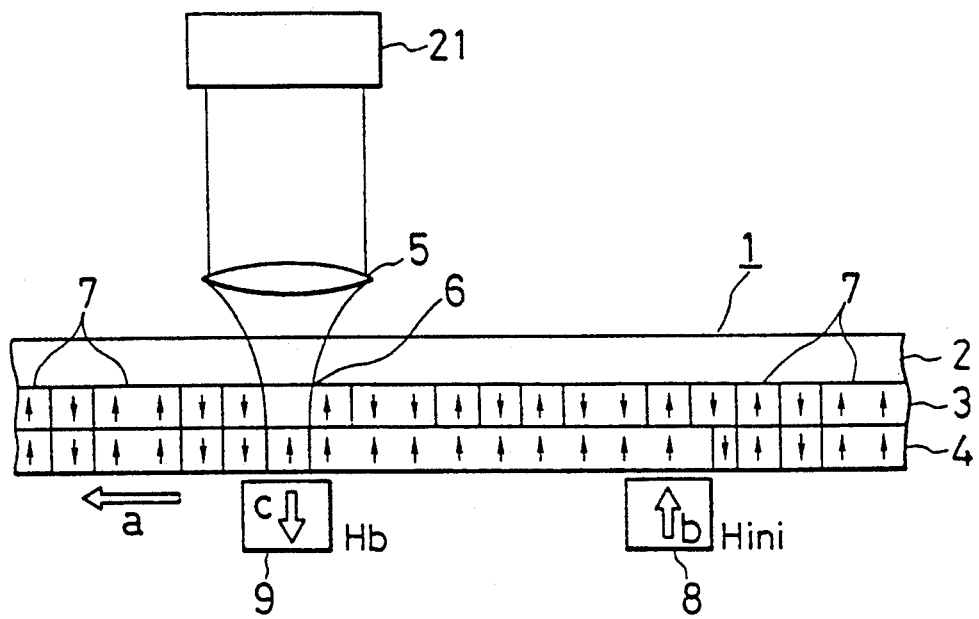
FIG. 3B is a cross-sectional view of the prior art indicating how information is written.
Figure 3B:
Figure 3B:

Another embodiment of this invention is shown in FIGS. 2A and 2B. In this embodiment the initializing magnet 8 is placed on the same side of the information-carrying medium 1 as the objective lens 5. This enables the apparatus to be made still more compact.

In the above embodiments the initializing magnetic field Hini pointed up and the magnetic bias field Hb pointed down (in the direction of the substrate 2), but the opposite arrangement, in which Hini points down and Hb points up (in the direction opposite the substrate 2), is also possible. The effect of the invention remains the same.

What is claimed is:

1. A magneto-optic recording and reproducing apparatus comprising:
   a magneto-optic information carrying medium comprising:
      a substrate layer for facing a laser beam to be incident thereon for recording or reproducing information on said medium;
      a first magnetic layer adjacent said substrate layer;
      a second magnetic layer adjacent said first layer;
      a third magnetic layer adjacent said second layer, said third magnetic layer being premagnetized in a predetermined uniform direction substantially parallel to said incident laser beam;
      said first, second, and third magnetic layers having Curie temperatures designated Tc1, Tc2 and Tc3, respectively, and coercive forces Hc1, Hc2 and Hc3, respectively;
      the Curie temperatures of said layers satisfying the relationship Tc1<Tc2<Tc3;
      the coercive forces of said layers satisfying at least one of the relationships
      Hc1>Hc3>Hc2, or
      Hc1>Hc2 and Hc3>Hc2;
   magnetizing means for generating a magnetic field designated Hini in a direction opposite to said predetermined uniform direction of said third magnetic layer, for controlling the magnetization of the second magnetic layer at room temperature and wherein the intensity Hini of said magnetizing means is related to the coercive forces of said magnetic layers by the expressions:
   Hini<Hc1, Hini>Hc2, and Hini<Hc3;
   controlling means for controlling said laser beam so that said laser beam can be at one of first, second and third intensities, said first intensity for causing the magnetization on said first, second, and third magnetic layers to remain in previous states and not be affected by rises in temperature in said layers caused by said laser beam, said second intensity for causing the magnetization of the first magnetic layer to be erased by causing the temperature in said first magnetic layer to exceed the Curie temperature Tc1 of the first magnetic layer, but not causing the temperature in said second and third magnetic layers to exceed their respective Curie temperatures, Tc2 and Tc3, so as not to affect the magnetizations of said second and third magnetic layers, and said third intensity for causing the magnetizations of said first and second layers to be erased by causing the temperatures in said first and second magnetic layers to exceed their respective Curie temperatures, Tc1 and Tc2, but not to exceed the Curie temperature Tc3 of said third layer so as not to affect the magnetization of said third layer.

2. A magneto-optic recording and reproducing apparatus according to claim 1, and further comprising:
   an objective lens on a same side of said medium as said laser beam for focusing said laser beam onto said medium; and
   wherein the magnetizing means is located on the side of said medium opposite said objective lens.

3. A magneto-optic recording and reproducing apparatus according to claim 1, and further comprising:
   an objective lens on a same side of said medium as said laser beam for focusing said laser beam onto said medium; and
   wherein the magnetizing means is located on the same side of the information-carrying medium as said objective lens.

4. A magneto-optic recording and reproducing apparatus according to claim 1,
   wherein the magnetizing means magnetizes the second magnetic layer so that the magnetic alignment of said second layer points toward the substrate.

5. A magneto-optic recording and reproducing apparatus according to claim 1,
   wherein the magnetizing means magnetizes the second magnetic layer so that the magnetic alignment of said second layer points opposite the substrate.

6. A magneto-optic recording and reproducing apparatus comprising:
   magnetizing means for generating an initializing magnetic field Hini;
   means for emitting a laser beam for recording or reproducing information on said medium;
   a magneto-optic information carrying medium comprising:
      a first magnetic layer stacked on said substrate and adjacent therewith and having a first Curie temperature Tc1 and a first coercive force Hc1;
      a second magnetic layer stacked on said first magnetic layer and adjacent therewith and having a second Curie temperature Tc2 and a second coercive force Hc2; and
      a third magnetic layer stacked on said second magnetic layer and adjacent therewith and having a third Curie temperature Tc3 and a second coercive force Hc3;
      said third magnetic layer being premagnetized in a direction opposite to said initializing magnetic field to generate a magnetic field weaker than is necessary to reverse the direction of magnetization of said first magnetic layer and said second magnetic layer at temperatures below their respective Curie temperatures, and sufficiently strong enough to magnetize said first magnetic layer and said second magnetic layer when said first magnetic layer and said second magnetic layer have reached their respective Curie temperatures Tc1 and Tc2 to destroy the magnetic alignments therein;
      the Curie temperatures of said first, second and third magnetic layers satisfying the relationship:
      Tc1<Tc2<Tc3; and
      the coercive forces of said first, second and third magnetic layers, and said initializing magnetic field satisfying the relationships:
      Hc2<Hini, Hini<Hc1, and Hini<Hc3; and
   means for moving said medium past said magnetizing means and said laser beam;
   said magnetizing means applying said initializing magnetic field Hini to said medium to magnetize said second magnetic layer in the direction of said initializing magnetic field while unaffecting said first magnetic layer and said third magnetic layer; and
   said laser beam emitting means capable of controlling said laser beam so that said laser beam can be at one of first, second and third intensities, said first intensity for causing the magnetization of said first, second, and third magnetic layers to remain in previous states, said second intensity for causing the magnetization of the first magnetic layer to be erased by causing the temperature in said first magnetic layer to exceed the Curie temperature Tc1 of the first magnetic layer, but not causing the temperature in said second and third magnetic layers to exceed their respective Curie temperatures, Tc2 and Tc3, so as not to affect the magnetizations of said second and third magnetic layers, and said third intensity for causing the magnetizations of said first and second magnetic layers to be erased by causing the temperatures in said first and second magnetic layers to exceed their respective Curie temperatures, Tc1 and Tc2, but not to exceed the Curie temperature Tc3 of said third magnetic layer so as not to affect the magnetization of said third magnetic layer.

7. The apparatus according to claim 6, wherein said magnetic layers have axes of easy magnetization in the direction of the thickness thereof.

8. The apparatus according to claim 6, wherein said third magnetic layer comprises a layer of a ferromagnetic material.

9. The apparatus according to claim 6, wherein said means for moving the medium comprises means for rotating the medium.

10. The apparatus according to claim 6, wherein said magnetizing means comprises a permanent magnet.

* * * * *